April 1, 1930.                M. L. MARTUS                1,753,154
                            HEADLESS SET SCREW
                            Filed Feb. 24, 1927
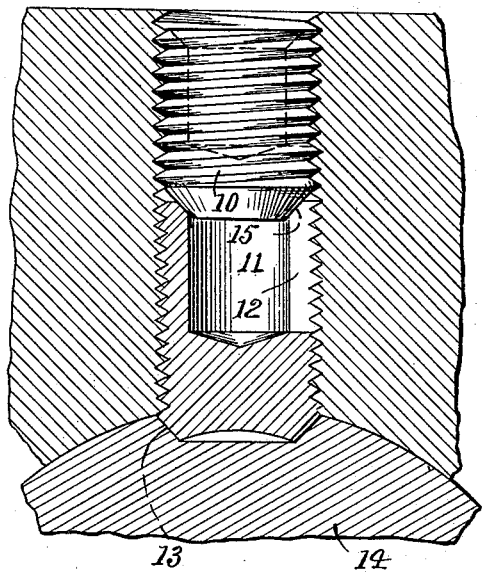
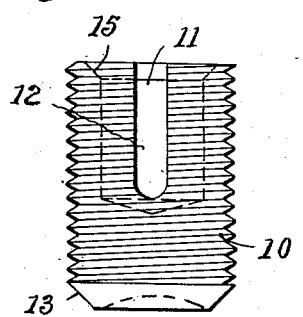
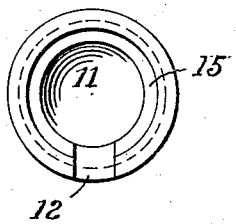
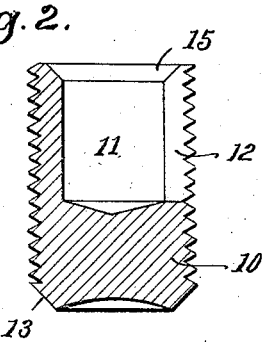
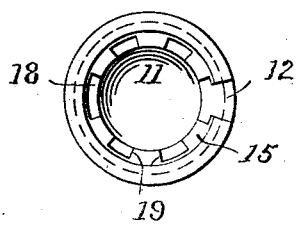
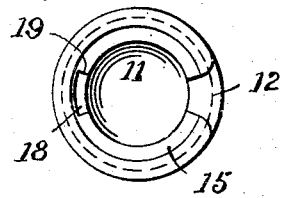
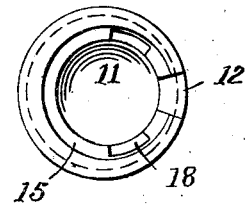
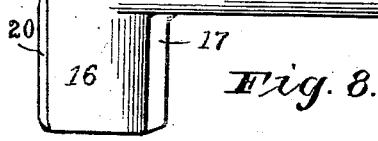
INVENTOR.
Martin L. Martus
BY
Chamberlain & Newman
ATTORNEYS.

Patented Apr. 1, 1930

1,753,154

UNITED STATES PATENT OFFICE

MARTIN L. MARTUS, OF WOODBURY, CONNECTICUT

HEADLESS SET SCREW

Application filed February 24, 1927. Serial No. 170,519.

This invention relates to certain new and useful improvements in headless set screws such as are designed to be embedded in the member in which they are seated, for the purpose of securing the same to a shaft or other member, as for example in the attachment of a collar or pulley on a shaft, or the like, and in a way to lock the parts together and securely hold the same, with a view of preventing the turning of the collar or pulley upon the shaft.

The object of the invention is to provide a hollow form of set screw including an annular thread upon its peripheral surface and a slot in its side to permit of slight expansion and contraction, and particularly to provide a tapered annular lower end portion and an inner annular tapered top end portion, the two said tapered portions being of substantially the same size and proportion, so that the tapered lower end portion of one screw may be seated in the tapered inner annular end portion of a similar screw for the purpose of spreading and locking the same after it has been seated as in use.

A further feature of the invention is to provide internal longitudinal recesses in the inner side wall of the screw having shouldered portions that are in alignment with the longitudinal center or axis of the screw, and against which the corresponding shouldered portions of ribs upon a wrench may be seated, and whereby the said screws are turned into and out of suitably tapped screw holes.

With these and other objects in view, the invention resides and consists in the construction and novel combination and arrangement of parts hereinafter more fully described, illustrated in the accompanying drawings, and pointed out in the claims hereto appended, it being understood that various changes in the form, proportion, size, and minor details of construction within the scope of the claims may be resorted to without departing from the spirit, or sacrificing any of the advantages of the invention.

Similar characters of reference denote like or corresponding parts throughout the several figures of the accompanying drawings forming a part of this specification and upon which Fig. 1 shows an enlarged sectional elevational view, of two set screws constructed in accordance with my invention and positioned one against the other in a threaded hole of a collar or other member mounted upon a shaft;

Fig. 2 is a vertical longitudinal sectional view of one of my improved screws, and corresponding with the showing of the inner screw of Fig. 1;

Fig. 3 is a plan view of the screws shown in Figs. 1 and 2;

Fig. 4 is a side elevation of the screws shown in the preceding figures, said view being taken from the right of the screw shown in Figs. 1 and 2;

Figs. 5 and 6 show top plan views of screws of the same general character and illustrating different forms and numbers of recesses for the shouldered ribs of the wrench, as well as the expansion slot as in the other figures;

Fig. 7 shows a further plan view of a screw having a slot for expansion and pockets for the attachment of a wrench and whereby with the turning of the screw with a wrench, a more binding effect of the screw in its pocket is obtained; and Fig. 8 shows a small side view of a wrench adapted for turning the screws in the threaded holes.

Referring in detail to the characters of reference marked upon the drawings, the set screw as will be seen is a headless form of peripherally threaded screw made of a single piece of metal having a solid lower end portion 10 and a hollow upper body portion forming a socket 11. A longitudinal slot 12 is provided in one side of the body, preferably of the depth of the socket 11, which permits the annular body portion to be expanded. The lower end of the screw is provided with a beveled annular peripheral portion 13 for engagement with a shaft or member 14, against which the screw is to be seated. The upper annular end portion of the body of the screw is provided with an inner annular beveled seat 15 of substantially the same size and taper as the lower annular beveled portion of the screw so that when said screws are positioned one against the other, the outer screw may be tightly set into the beveled end socket of the first mentioned screw, in a way to spread the same and lock it in position against further turning. The said action obviously serves to spread the upper cylindrical end peripherally threaded portion of the inner screw, against the threaded wall of the tapped hole in which it is seated so as to prevent movement of the screw after it has once been set in position.

The screws may be turned and set by any suitable means, preferably a simple form of wrench somewhat like that illustrated in Fig. 8, and having a round elongated end portion 16 of a size and shape to fit into the socket of the body portion 11, of the screw and further includes a longitudinal rib or projection 17 to enter the before mentioned slots 12 in a way to insure the turning of the screw with the said wrench.

These screws may also be provided with vertical grooves 18 in the side wall of the socket 11, of the body, as seen in Figs. 5, 6 and 7. The sides of these grooves, specifically designated as 19, are preferably formed in radial alignment with the center or axis of the screw in a way to form a better engagement of the ribs on the wrench with the body of the screw as will be apparent.

For a screw of the type shown in Figs. 5, 6 and 7, having longitudinal pockets formed therein, in addition to the longitudinal slot 12 before mentioned, a slightly different form of wrench would be employed, that is one having one or more smaller longitudinal ribs as designated by 20 in addition to the larger rib 17 heretofore mentioned.

With a screw made in accordance with my invention it is possible to obtain a greater direct leverage in the screw itself than is possible by any screw of this type heretofore made, hence the screw can be set up tighter with less effort.

Having thus described my invention, what I claim and desire to secure by Letters Patent is:

1. A headless expandible set screw of the character described including a solid lower end portion having a portion of its peripheral surface tapered and the remainder thereof threaded, a socket in its upper end portion, a longitudinal slot in the side of the screw opening and extending only to the depth of the socket, and an inner annular tapered top end portion surrounding the open end of the socket and adapted to be expanded into locking engagement with its seat by the correspondingly tapered end portion of a similar screw when positioned thereagainst, either one of said screws being capable of use as a set screw or as a locking member.

2. The structure as set forth in claim 1 in which the socket below its tapered portion is provided with a wrench engaging shoulder.

Signed at Waterbury in the county of New Haven and State of Connecticut, this 21st day of February, A. D. 1927.

MARTIN L. MARTUS.